3,318,741
THICKENED NITROPARAFFIN CONTAINING STABILIZER
Lawrence R. Jones, Terre Haute, Ind., assignor to Commercial Solvents Corporation, New York, N.Y., a corporation of Maryland
No Drawing. Filed Apr. 8, 1965, Ser. No. 446,736
8 Claims. (Cl. 149—89)

This invention relates to nitroparaffin-containing compositions. In a particular aspect it relates to gelled or thickened normally liquid nitroparaffin compositions. In a further aspect it relates to gelled or thickened normally liquid nitroparaffin compositions stabilized against liquefaction.

Liquid nitroparaffins, such as nitromethane and nitroethane, are used as propellants in jet propulsion devices and in explosives. It is desirable in some cases to employ the normally liquid nitroparaffins in a gelled or thickened form. It is also often desirable that these gelled or thickened forms of nitroparaffin compositions be stabilized against liquefaction for extended periods of time.

It is an object of the present invention to provide gelled or thickened normally liquid nitroparaffins, particularly nitromethane and nitroethane.

It is a further object of the present invention to provide gelled or thickened nitroparaffins, particularly nitromethane and nitroethane which are stabilized against liquefaction over extended periods of time.

It is a still further object of the present invention to provide a method for gelling or thickening normally liquid nitroparaffins, particularly nitromethane and nitroethane.

It is an additional object of the present invention to provide a method for stabilizing gelled or thickened normally liquid nitroparaffins, particularly nitromethane and nitroethane.

Other objects and advantages of the present invention will be apparent from the specification and the appended claims.

The present invention in a first embodiment resides in the discovery that a nitroparaffin selected from the group consisting of nitromethane and nitroethane and mixtures thereof is converted from its normally liquid form to thickened compositions having viscosities ranging from syrupy liquids to rigid gels by incorporating therewith high molecular weight polyoxyethylene.

The present invention in a second embodiment resides in the discovery that thickened compositions of a nitroparaffin selected from the group consisting of nitromethane and nitroethane and high molecular weight polyoxyethylene are made stable against liquefaction for extended periods of time by the inclusion therein of poly(methylvinylether/maleic anhydride).

The polyoxyethylene of use in the present invention is of high molecular weight. Specifically, the average molecular weight is in the range of about one hundred thousand to about five million. The high molecular weight polyoxyethylene is obtained by the polymerization of ethylene oxide. These polymers are commercially available.

The poly(methylvinylether/maleic anhydride) compounds of use in the present invention are copolymers of methylvinylether and maleic anhydride. These copolymers are also commercially available.

The compositions of the present invention are obtained by adding the high molecular weight polyoxyethylene to the liquid nitroparaffin at temperatures and under pressures at which explosion of the nitroparaffin is avoided. Room temperature and atmospheric pressure are conveniently employed. The poly(methylvinylether/maleic anhydride) may be separately added to the nitroparaffin either before or after addition of the high molecular weight polyoxyethylene or it may be added as a mixture with the high molecular weight polyoxyethylene.

The ratio of nitroparaffin to high molecular weight polyoxyethylene may be varied in order to obtain the particular desired compositions. A trace of polyoxyethylene has a thickening effect on the nitroparaffin with which it is employed. A fairly thick nitroparaffin composition is formed by incorporating in the nitroparaffin as low as about 0.5 percent by weight of polyoxyethylene the weight based on the nitroparaffin. Reasonably rigid gels are formed when about 1 to about 5 percent by weight of polyoxyethylene is employed. Particularly stiff gels are obtained by use of amounts of polyoxyethylene in excess of 5 percent by weight. The amount of polyoxyethylene which may be incorporated in the nitroparaffin composition by stirring alone does not appreciably exceed 10 percent by weight based on the weight of the nitroparaffin. If it is desired to obtain homogeneous mixtures of nitroparaffin and polyoxyethylene containing in excess of 10 percent by weight of polyoxyethylene, it is preferable to mill or knead the mixtures.

The ratio of nitroparaffin to poly(methylvinylether/maleic anhydride) also may vary. A trace of poly(methylvinylether/maleic anhydride) has a stabilizing effect on compositions of nitroparaffin and polyoxyethylene. Generally it is preferred to use from about 0.1 to about 5.0% by weight of poly(methylvinylether/maleic anhydride) based on the weight of the nitroparaffin. While amounts greater than 5 percent poly(methylvinylether/maleic anhydride) may be employed such amounts are considered excess.

The above described compositions may be employed as propellants or in explosive compositions. However it is sometimes desirable to incorporate one or more additives into the compositions in order to alter or enhance their performance in a particular application. For example, when the compositions are used as explosives, it is often desirable to incorporate therewith a sensitizer or a desensitizer. When the compositions are used as propellants, additives such as fuel components, oxidizers and burning catalysts may be utilized.

Examples of sensitizers include the aromatic amines such as aniline, diphenylethylene diamine and the like; and the aliphatic amines such as diethylamine, tetraethylene pentamine and the like.

Examples of desensitizers include benzene, 1,2-butylene oxide, acetone, cyclohexane, 1,4-dioxane, 1-nitropropane, methanol, 2-nitropropane, methylene chloride, and methyl chloroform.

Examples of fuel components include elemental carbon in various forms such as carbon black, graphite, and the like; aliphatic hydrocarbons such as pentane, octane, dodecane, cyclohexane and other cyclic paraffins; organic polymers such as liquid and solid polymers of ethylene and propylene; organic ketones such as diethylketone, ethyl butyl ketone, dihexylketone, cyclohexanone, methylphenyl ketone and the like; and alkyl ethers of saturated glycols such as monomethylether of ethylene glycol and monoethylether of ethylene glycol and the like.

Examples of oxidizers include solid organic oxidizers such as guanidine nitrate, pentaerythritol tetranitrate, cyclotrimethylene trinitramine and the like; and solid inorganic oxidizers such as ammonium nitrate, lithium nitrate and the like.

Examples of burning rate catalysts include chrome acetyl acetonate, ammonium chromate, iron oxide and the like.

The invention will be understood more fully by reference to the following specific examples. It is understood that the examples are presented for the purpose of illustration only and are not intended as a limitation of the invention.

Examples 1–6 inclusive are offered to illustrate the ability of high molecular weight polyoxyethylene to form thickened compositions with normally liquid nitroparaffins.

*Example 1*

A rigid gel was prepared by mixing 97 parts by weight of nitromethane and 3 parts by weight of a high molecular weight polyoxyethylene manufactured by Union Carbide Corporation and commercially sold under the name Polyox WSR–301. The gel was allowed to stand at room temperature for one week. At the end of the one-week period a small amount of liquefaction of the gel had occurred.

Additional examples of compositions of nitroparaffins and high molecular weight polyoxyethylene are given in Table 1. In Example 3 a high molecular weight polyoxyethylene manufactured by Union Carbide Corporation and sold under the name Polyox Coagulant is used. In Example 5 a high molecular weight polyoxyethylene manufactured by Union Carbide Corporation and sold under the name of Polyox WSR–205 is utilized. In Example 6 a high molecular weight polyoxyethylene manufactured by Union Carbide Corporation and sold under the name Polyox WSR–35 is used. The compositions were prepared following the procedure of Example 1 and were found to have stability similar to the composition of Example 1.

TABLE 1

| Example | Nitroparaffin | Parts by Weight | Gelling Agent | Parts by Weight |
|---|---|---|---|---|
| 2 | Nitromethane | 98 | High molecular weight polyoxyethylene (Polyox WSR–301) | 2 |
| 3 | do | 97 | High molecular weight polyoxyethylene (Polyox Coagulant) | 3 |
| 4 | Nitroethane | 96 | High molecular weight polyoxyethylene (Polyox WSR–301) | 4 |
| 5 | Nitromethane | 92 | High molecular weight polyoxyethylene (Polyox WSR–205) | 8 |
| 6 | do | 90 | High molecular weight polyoxyethylene (Polyox WSR–35) | 10 |

Examples 7–11 inclusive are offered to illustrated the ability of poly(methylvinylether/maleic anhydride) to stabilize thickened nitroparaffin compositions.

*Example 7*

A rigid gel was prepared by mixing 97 parts by weight of nitromethane, 2 parts by weight of high molecular weight polyoxyethylene manufactured by Union Carbide Corporation and commercially sold under the name Polyox WSR–301 and 1 part by weight of poly(methylvinylether/maleic anhydride) manufactured by General Aniline and Film Corporation and commercially sold under the name Gantrez–139. The gel was allowed to stand at room temperature for thirty days. At the end of the thirty-day period no signs of liquefaction of the gel were observed.

Additional examples of stabilized compositions of nitroparaffins, high molecular weight polyoxyethylene and poly(methylvinylether/maleic anhydride) are given in Table 2. In Example 10 a copolymer of methylvinylether and maleic anhydride manufactured by General Aniline and Film Corporation and commercially sold under the name Gantrez–119 is used. In Example 11 a copolymer of methylvinylether and maleic anhydride manufactured by General Aniline and Film Corporation and commercially sold under the name Gantrez–169 is used. The compositions were prepared following the procedure of Example 7. The compositions were found to be stable against liquefaction.

TABLE 2

| Example | Nitroparaffin | Parts by Weight | Gelling Agent | Parts by Weight | Stabilizing Agent | Parts by Weight |
|---|---|---|---|---|---|---|
| 8 | Nitromethane | 98 | High molecular weight polyoxyethylene (Polyox WSR–301) | 1 | Poly(methylvinylether/maleic anhydride) (Gantrez–139) | 1 |
| 9 | Nitroethane | 98 | do | 1 | do | 1 |
| 10 | Nitromethane | 97 | do | 2.5 | Poly(methylvinylether/maleic anhydride) (Gantrez–119) | 0.5 |
| 11 | do | 95 | do | 2.5 | Poly(methylvinylether/maleic anhydride) (Gantrez–169) | 1.5 |

Since many embodiments of this invention and since many changes may be made in the embodiments described, the foregoing is to be interpreted as illustrative only and the invention is defined by the claims appended hereto.

I claim:

1. A composition of matter comprising a nitroparaffin selected from the group consisting of nitromethane and nitroethane and polyoxyethylene having a molecular weight of at least 100,000, said polyoxyethylene being present in amounts effective to thicken the nitroparaffin.

2. The composition of claim 1 wherein the composition contains from about 0.5 to about 10 percent by weight of polyoxyethylene based on the weight of the nitroparaffin.

3. The composition of claim 1 wherein the composition contains from about 1.0 to about 5.0 percent by weight of polyoxyethylene based on the weight of the nitroparaffin.

4. A gelled or thickened normally liquid composition comprising a nitroparaffin selected from the group consisting of nitromethane and nitroethane, polyoxyethylene having a molecular weight of at least 100,000, and poly(methylvinylether/maleic anhydride), the said poly(methylvinylether/maleic anhydride) being present in amounts effective to stabilize the composition.

5. The composition of claim 4 wherein the polyoxyethylene is present in amounts ranging from about 0.5 to about 10 percent by weight based on the weight of the nitroparaffin.

6. The composition of claim 5 wherein the poly(methylvinylether/maleic anhydride) is present in amounts ranging from about 0.1 to about 5 percent by weight based on the weight of the nitroparaffin.

7. A method for gelling or thickening a nitroparaffin selected from the group consisting of nitromethane and nitroethane which comprises incorporating in the nitroparaffin from about 0.5 to about 10 percent by weight of polyoxyethylene having a molecular weight of at least 100,000, the weight percent based on the weight of the nitroparaffin.

8. A method for stabilizing gelled or thickened nitroparaffins selected from the group consisting of nitromethane and nitroethane which comprises incorporating from about 0.1 to about 5.0 percent by weight of poly(methylvinylether/maleic anhydride) into a composition comprising a nitroparaffin and from about 0.5 to about 10 percent by weight of polyoxyethylene having a molecular weight of at least 100,000, the weights based on the weight of the nitroparaffin.

References Cited by the Examiner

UNITED STATES PATENTS

| | | | |
|---|---|---|---|
| 2,867,647 | 1/1959 | Gow et al. | 149—93 X |
| 2,891,852 | 6/1959 | Schaad | 149—89 |
| 3,035,948 | 5/1962 | Fox | 149—89 X |
| 3,035,950 | 5/1962 | Long | 149—89 X |
| 3,043,099 | 7/1962 | Wilson | 149—89 X |
| 3,166,453 | 1/1965 | Merges | 149—109 |
| 3,203,841 | 8/1965 | Doyle | 149—19 X |
| 3,242,022 | 3/1966 | Atkins et al. | 149—89 |
| 3,288,867 | 11/1966 | Egly et al. | 149—89 X |

CARL D. QUARFORTH, *Primary Examiner.*

BENJAMIN R. PADGETT, *Examiner.*

S. J. LECHERT, JR., *Assistant Examiner.*